US011294930B2

(12) United States Patent
Chen et al.

(10) Patent No.: US 11,294,930 B2
(45) Date of Patent: Apr. 5, 2022

(54) RESOURCE SCALING FOR DISTRIBUTED DATABASE SERVICES

(71) Applicant: Citrix Systems, Inc., Fort Lauderdale, FL (US)

(72) Inventors: Yongyu Chen, Nanjing (CN); Lei Xu, Nanjing (CN); Wei Long, Nanjing (CN); Liang Bao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 612 days.

(21) Appl. No.: 16/244,575

(22) Filed: Jan. 10, 2019

(65) Prior Publication Data

US 2020/0226144 A1    Jul. 16, 2020

(51) Int. Cl.
*G06F 16/00* (2019.01)
*G06F 16/27* (2019.01)
*G06F 16/21* (2019.01)
*G06F 16/25* (2019.01)

(52) U.S. Cl.
CPC .............. *G06F 16/27* (2019.01); *G06F 16/21* (2019.01); *G06F 16/258* (2019.01)

(58) Field of Classification Search
CPC ........ G06F 16/21; G06F 16/258; G06F 16/27; G06F 2209/5019; G06F 9/5061; G06N 20/10; G06N 3/08; G06N 7/005
See application file for complete search history.

(56) References Cited

U.S. PATENT DOCUMENTS

| 10,409,642 | B1 * | 9/2019 | Tang | G06F 9/5061 |
|---|---|---|---|---|
| 2013/0190027 | A1 * | 7/2013 | Cao | H04W 52/0206 |
| | | | | 455/509 |
| 2014/0105032 | A1 * | 4/2014 | Qian | H04W 24/00 |
| | | | | 370/242 |
| 2014/0215487 | A1 * | 7/2014 | Cherkasova | G06F 9/5083 |
| | | | | 718/106 |
| 2018/0324199 | A1 * | 11/2018 | Crotinger | G06F 16/248 |
| 2019/0007285 | A1 * | 1/2019 | Nevo | H04L 43/08 |
| 2019/0239101 | A1 * | 8/2019 | Ouyang | G06N 3/084 |

* cited by examiner

*Primary Examiner* — Dinku W Gebresenbet
(74) *Attorney, Agent, or Firm* — Foley & Lardner LLP

(57) ABSTRACT

Described embodiments provide systems and methods for resource scaling. A computing device may include a data processor. The data processor may receive, from a distributed database service (DDS), usage data on resource request-units from a plurality of services that use resources provided by the DDS. The computing device may include a transform agent. The transform agent may transform at least a subset of the N sets of data, into at least three transformed datasets each corresponding to a different frequency range. The computing device may include a predictor. The predictor may provide a predicted value of request-units according to the at least three transformed datasets. The predictor may request the DDS to provide the resources up to a number of request-units at a given time instance according to the predicted value.

20 Claims, 4 Drawing Sheets

RESOURCE SCALING FOR DISTRIBUTED DATABASE SERVICES

FIELD OF THE DISCLOSURE

The present application generally relates to database services management, including but not limited to systems and methods for resource scaling of distributed database services.

BACKGROUND

A database may store a collection of data in an organized manner. A database management system may maintain and control access to the data on the database via a network. Through the database management system, an application may access the database through the network to retrieve or modify the data and add new data onto the database. The accessing of the database may consume resources of the database management system.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A distributed database service (DDS) may administer and maintain a multitude of databases to store data through a network environment. The databases may be distributed across several geographic locations all interconnected through the network environment. The databases may store and organize data in accordance to various database models, such as relational models, column data storage, document-oriented databases, key-value stores, and graph databases, among others. Separate services connected to the network environment may also handle and manage the storage of the data onto the databases. In arranging the data, each service may be dedicated to one or more of the database management, and may run operations on the data using the specified models. The operations may include, for example, reading data, writing onto the data, moving the data, adding new data, deleting existing data, setting relations, and querying, among 4843-8712-3076.1 others. The services may interface with the distributed database service to carry out the operations on the data maintained on the databases.

Several challenges may arise in the interfacing among the distributed database service, the separate services, and the databases. In executing the operation, the service may use an application programming interface (API) to invoke specific functions of the distributed database service to access the databases as specified by the function. The invocation of the function in turn may cause the distributed database service to consume computation resources, such as processor, memory, and/or network bandwidth. The distributed database service may set an allocated threshold of computational resources to each service in executing operations for the service. The consumption of computational resources may be measured in terms of request-units (RUs). A request unit may be an aggregated normalized sum of the consumption of the processor, memory, and/or network bandwidth in executing the operation. The allocated threshold may be pre-set, and may be fixed for all times for the particular service. Some of these operations may use more computational resources than the allocated threshold. This may be the case during especially during peak usage times, and the allocation threshold may be increased to combat the spikes in utilization of the computational resources. However, the vast majority of the operations may expend less computation resources than the allocated threshold, leading to wasted or under-utilized resources reserved to the service.

To address the technical challenges in resource management, a resource allocator connected to the network environment may dynamically adjust the allocated threshold by predicting the utilization of computational resources requested by the services. To predict the utilization of computational resources, the resource allocator may access resource consumption data for each service from the distributed database service. The resource consumption data may indicate the number of request units used by the service over time in carrying out various operations on the distributed database service. The resource allocator may divide the consumption data into N sets for instance, with each set corresponding to a different time window. From the N sets (e.g., each of length n), M subsets corresponding to M previous time windows prior to the current time may be transformed (e.g., using wavelet transformation) into at least k datasets (e.g., with k≥3). Each of the transformed datasets (e.g., of length $m_k$) may correspond to a differing frequency range.

On each of the k-th transformed datasets, the resource allocator may apply a model (e.g., an autoregressive-moving average model (ARMA)) to generate or obtain k new datasets (e.g., each of length $m_k$+r, where r can be 0 or 1), to produce prediction data (e.g., of length n+1) for the corresponding frequency range of each dataset. The resource allocator may apply recomposing or reverse transformation (e.g., Reverse Wavelet Transform) to the prediction data (e.g., prediction data combined over/across the frequency ranges) to generate an initial predicted value (Pre).

For instance, if Wavelet Transform is used to decompose or transform datasets of length n into 3 datasets, two of the 3 datasets can share the same data length. For example, if n=30, the length of 3 datasets may be 18, 12, 12. Using these datasets, ARMA can be applied to generate new datasets with lengths of 19, 13, 13. Then, recomposing the new datasets can yield prediction data of length n+1=31. If the lengths of the 3 datasets are 20, 13, 13, recomposing the corresponding new datasets can yield prediction data of length 33. In this case, the predicted data is also useful but 2 extra data should be dropped. There may be no result if we try to recompose new datasets with lengths of 20, 14, 14.

The new datasets each has a length of $m_K$+r, where r can be 0 or 1, such that there are only two possible lengths for each new dataset. For example, if the lengths of the 3 datasets are A, B, B, ARMA can be applied to generate new datasets with lengths of A+1, B, B or A+1, B+1, B+1. Recomposing (e.g., using revert Wavelet Transform) the new datasets can produce prediction data of length n+1 or n+2 or n+3.

To account for any spikes, other sudden increases or other potential anomalies, a correction factor (a*Inc) may be added to the initial predicted value to determine a predicted value (Fin=Pre+a*Inc). In some embodiments, such a correction factor is not added, and thus Fin=Pre. In addition, an amount based on the standard deviation of the resource consumption data over the M subsets may be added by the resource allocator to the predicted value Fin as a buffer to compute a final predicted value (Est=$Finn_k$+2σ). Using the final predicted value, the resource allocator may determine or set an overall predicted value for the utilization of the computation resources. With the overall predicted value, the resource allocator may dynamically set the allocation threshold to request the distributed database service to provide a specific number of request units to the service at a given time. As the predicted value may more closely match the actual consumption for the operations of the services, the likelihood of under-utilization in computational resources may be reduced. Hence, dollar costs associated with allocating the computational resources (e.g., or request units) can be substantially reduced by dynamically setting the allocation threshold, as compared to a setup that sets and uses a static allocation threshold. In this manner, resources on the distributed database services may be saved, freeing up computational resources for other functions.

At least one aspect of this disclosure is directed to a server (sometimes referred herein as a computing device) for resource scaling. The server may include a data processor. The data processor may receive, from a distributed database service (DDS), usage data on resource request-units from a plurality of services that use resources provided by the DDS. The server may include a transform agent. The transform agent may transform at least a subset of the N sets of data, into at least three transformed datasets each corresponding to a different frequency range. The server may include a predictor. The predictor may provide a predicted value of request-units according to the at least three transformed datasets. The predictor may request the DDS to provide the resources up to a number of request-units at a given time instance according to the predicted value.

In some embodiments, the data processor may store the received usage data into a queue in memory. In some embodiments, the data processor may perform a map-and-reduce of at least a portion of the usage data in real time, to provide a first set of the N sets of data. In some embodiments, the transform agent may transform the at least a subset of the N sets of data using Wavelet Transform. In some embodiments, the transform agent may process the at least a subset of the N sets of data as a stationary stochastic process. In some embodiments, the at least three transformed datasets may correspond to a dataset indicative of a trend, a dataset indicative of cyclic data, and a dataset indicative of noise.

In some embodiments, the predictor may provide the predicted value using at least one of: autoregressive-moving average model (ARMA) method, Kalman filtering, or Holt's Linear Trend method. In some embodiments, the predictor may perform a prediction on each of the at least three transformed datasets, and to provide the predicted value of request-units according to the predictions. In some embodiments, the predictor may determine a standard deviation of the at least a subset of the N sets of data. In some embodiments, the predictor may request the DDS to provide the resources up to an updated number of request-units at a given time instance according to the predicted value bounded by twice the standard deviation.

At least one aspect of this disclosure is directed to a method of resource-scaling. The method may include receiving, from a distributed database service (DDS), usage data on resource request-units from a plurality of services that use resources provided by the DDS. The method may include providing N sets of data corresponding to N time windows, using the usage data. The method may include transforming at least a subset of the N sets of data, into at least three transformed datasets each corresponding to a different frequency range. The method may include providing a predicted value of request-units according to the at least three transformed datasets. The method may include requesting the DDS to provide the resources up to a number of request-units at a given time instance according to the predicted value.

In some embodiments, the method may include storing the received usage data into a queue in memory. In some embodiments, the method may include performing a map-and-reduce of at least a portion of the usage data in real time, to provide a first set of the N sets of data. In some embodiments, the method may include transforming the at least the subset of the N sets of data using Wavelet Transform.

In some embodiments, the method may include processing the at least the subset of the N sets of data as a stationary stochastic process. In some embodiments, the at least three transformed datasets may correspond to a dataset indicative of a trend, a dataset indicative of cyclic data, and a dataset indicative of noise. In some embodiments, the method may include providing the predicted value using autoregressive-moving average model (ARMA) method, Kalman filtering, or Holt's Linear Trend method.

In some embodiments, the method may include performing a prediction on each of the at least three transformed datasets, and providing the predicted value of request-units according to the predictions. In some embodiments, the method may include determining a standard deviation of the at least a subset of the N sets of processed usage data. In some embodiments, the method may include requesting the DDS to provide the resources up to an updated number of request-units at a given time instance according to the predicted value bounded by twice the standard deviation.

At least one aspect of this disclosure is directed to a non-transitory computer readable medium storing program instructions. The program instructions may cause one or more processors to receive, from a distributed database service (DDS), usage data on resource request-units from a plurality of services that use resources provided by the DDS. The program instructions may cause one or more processors to provide N sets of data corresponding to N time windows, using the usage data. The program instructions may cause one or more processors to transform at least a subset of the N sets of data, into at least three transformed datasets each corresponding to a different frequency range. The program instructions may cause one or more processors to provide a predicted value of request-units according to the at least three transformed datasets. The program instructions may cause one or more processors to request the DDS to provide the resources up to a number of request-units at a given time instance according to the predicted value.

In some embodiments, the program instructions may further cause one or more processors to transform the at least a subset of the N sets of data using Wavelet Transform, into at least three transformed datasets each corresponding to a different frequency range. In some embodiments, the program instructions may further cause one or more processors to provide a predicted value of request-units according to the at least three transformed datasets, using an autoregressive-moving average model (ARMA) method.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
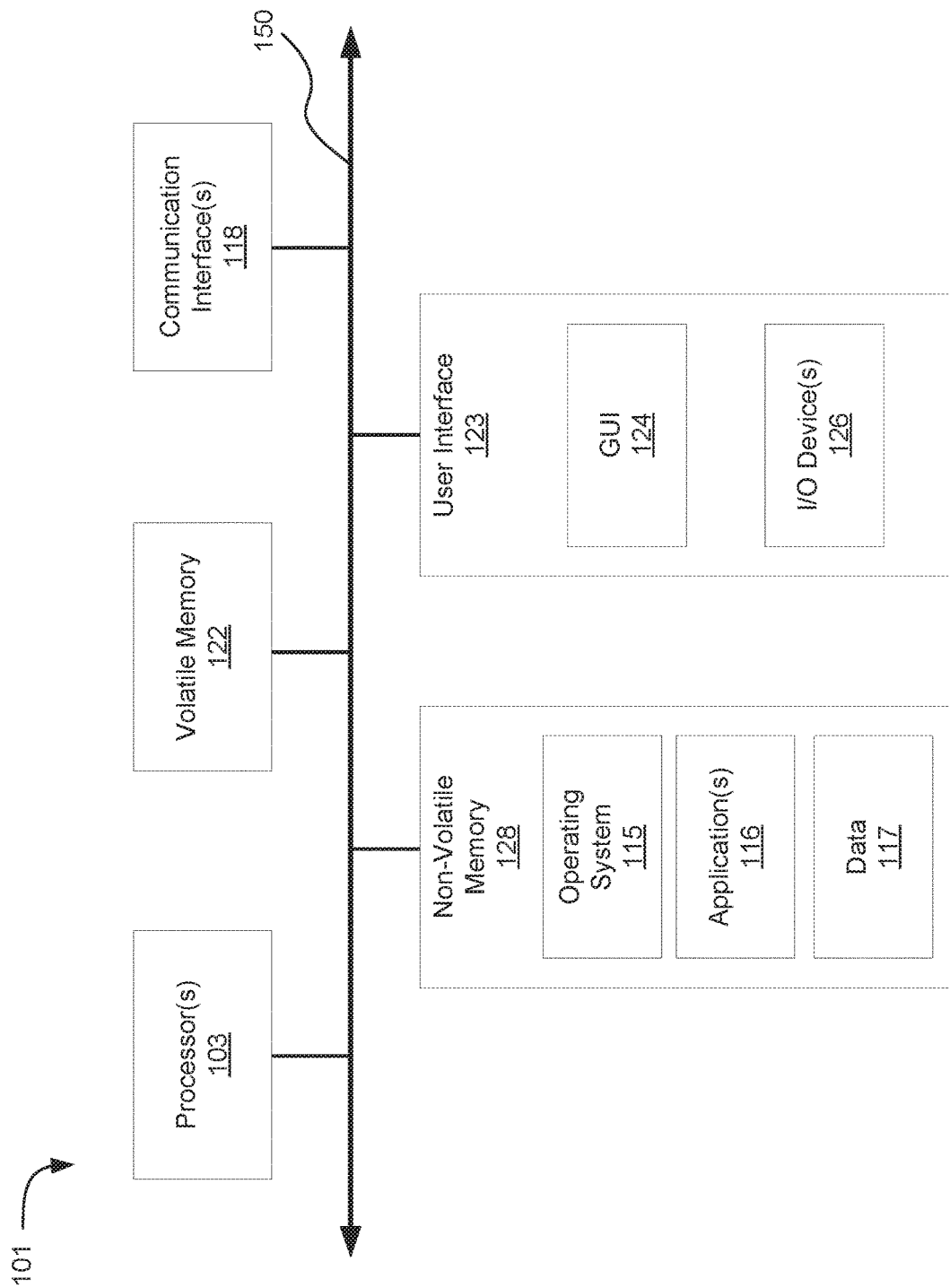
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for resource scaling for distributed database services.

A. Computing Environment

Prior to discussing the specifics of embodiments of the systems and methods of an appliance and/or client, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Resource Scaling for Distributed Database Services

Figure 2:
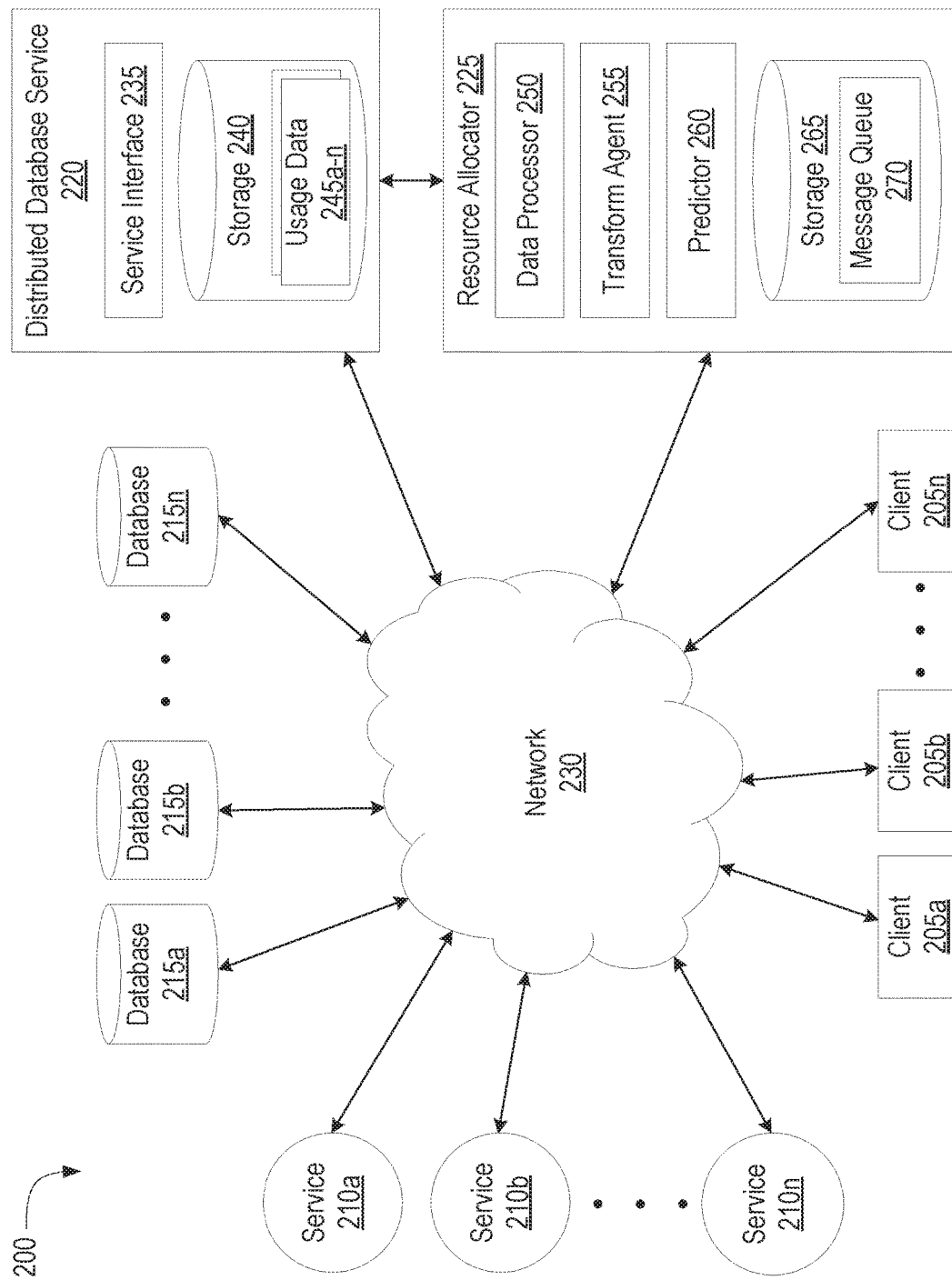
FIG. 2 is a block diagram of an illustrative embodiment of a system for resource scaling for distributed database services.

Referring now to FIG. 2, depicted is a block diagram of an embodiment of a system 200 for resource scaling for distributed database services. In brief overview, the system 200 may include one or more clients 205a-n (hereinafter generally referred to as client 205), one or more services 210a-n (hereinafter generally referred to as service 210), at least one distributed database service 220, one or more databases 215a-n (hereinafter generally referred to as database 215), and at least one resource allocator 225. The clients 205, the services 210, the databases 220, the distributed database service 220, and/or the resource allocator 225 may be situated or distributed across one or more differing geographic locations. The clients 205, the services 210, the databases 220, the distributed database service 220, and the resource allocator 225 may be communicatively coupled to one another via at least one network 230. In some embodiments, the network 230 may comprise or correspond to a private network (e.g., a virtual private network (VPN), a local area network (LAN), or a wide area network (WAN)). In some embodiments, the network 230 may comprise or correspond to a public network (e.g., the Internet or public switch telephone network (PSTN)). In some embodiments, the services 210, the databases 215, the distributed database service 220, and/or the resource allocator 225 may reside on the network 230 as part of a cloud computing system, with which the one or more clients 205 may connect.

The distributed database service 220 may include at least one service interface 235 and at least one storage 240 to store and maintain usage data 245a-n (hereinafter generally referred to as usage data 245). The resource allocator 225 (sometimes herein generally referred to a server or a computing device) may include at least one data processor 250, at least one transform agent 255, at least one predictor 260, and/or at least one storage 265 to store and maintain at least one message queue 270. In some embodiments, the resource allocator 225 may be separate from the distributed database service 220. In some embodiments, the resource allocator 225 may be part of the distributed database service 220, and the distributed database service 220 may perform the functionalities of the resource allocator 225. In some embodiments, the functionalities of the data processor 250, the transform agent 255, the predictor 260, and the storage 265 may be distributed between the distributed database service 220 and the resource allocator 225.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of clients 205, the services 210, the databases 215, the distributed database service 220 (including the service interface 235 and the storage 240), and the resource allocator 225 (including the data processor 250, the transform agent 255, the predictor 260, and the storage 265), among others. The hardware includes circuitry such as one or more processors in one or more embodiments.

In further detail, each database 215 may store and maintain data. The data may include any type, value, or symbol, among others that can be stored on a computer-readable storage unit. For example, the data may include numbers (e.g., binary, hexadecimal, decimal, double, float, or integer) or alphanumeric characters, or any combination thereof. The data may be arranged on the databases 215 in accordance with any database model. The database model may include: a relational database (e.g., Structured Query Language (SQL)), a column model (e.g., Apache Cassandra™, Apache Accumulo™, Amazon DynamoDB™, and Druid™), a document-oriented model (e.g., MongoDB™, OrientDB™, and Apache CouchDB™), a key-value model (e.g., Oracle NoSQL Database™, Apache River™, Apache Ignite™, and FoundationDB™), and a graph model (e.g., Gremlin™, ArangoDB™, and Apache Giraph™) among others. In some embodiments, each database 215 may be dedicated to or compatible with one or more of the database models. The data stored on the database 215 may be arranged or organized in accordance with one or more of the database models.

Each service 210 may administer and manage the data stored and maintained on one or more of the databases 215. The administering and managing of the data stored on the databases 215 may be perform through the distributed database service 220. In managing the data, the service 210 may arrange or organize the data on the one or more databases 215. In some embodiments, the service 210 may arrange the data on the databases 215 in accordance with one or more of the database models. In some embodiments, the service 210 may be assigned or dedicated to arranging the data in accordance with the one or more of the database models. For example, one service 210 may be dedicated to relationship databases, while another service 210 may be dedicated to a graph model in managing and organizing the data in the databases 215. In some embodiments, the service 210 may be assigned or dedicated to a particular set of databases 215 to manage over the network 230. In some embodiments, the service 210 may be assigned or dedicated to the databases 215 with data arranged in accordance with the same database models. For example, one service 210 may be dedicated to handling data arranged in accordance with the key-value model, and may manage the databases 215 with the data also arranged based on the key-value model. In some embodiments, the service 210 may be assigned or dedicated to the databases 215 in one or more geographical regions. For example, the service 210 may be assigned to manage databases 215 in North America.

Each service 210 may execute or carry out one or more operations on the data stored and maintained on one or more of the databases 215. The one or more operations on the data on one or more of the databases 215 may include: reading the data, writing onto the data, moving the data, adding new data onto the database 215, deleting existing data, defining relationships among the data, and querying for a subset of the data. Each operation may be defined by a function with one or more parameters. The function may specify a type of operation to be carried out. The parameters may include values or settings according to which the operation is to be executed on the data maintained on the database 215. For example, the function may be a query operation to find a subset of data from the database 215 and the parameters may be alphanumeric characters to search for. In some embodiments, the service 210 may carry out the operations in accordance with executable instructions, such as an application, program, library, script, task, or process, among others. The executable instructions may be configured on the service 210 (e.g., by an administrator of the service 210) or may be provided by one of the clients 205. In some embodiments, the service 210 may carry out the operations in response to receipt of a request from one of the clients 205 via the network. The request may specify the one or more operations to be carried out by the service 210. The request may also include the specified function with the one or more parameters. For example, an end user through the client 205 may send a request specifying the addition of an entity onto the existing data maintained on the database 215.

The execution of the one or more operations on the data maintained on the databases 215 may be facilitated or handled at least in part by the distributed database service 220. In carrying out operations on the data stored on the one or more databases 215, the service 210 may interface or otherwise communicate the distributed database service 220. The service 210 may generate a request to send to the distributed database 220 in furtherance of the operation. In some embodiments, the generation of the request may be in accordance with an application programming interface (API). The API may include a set of definitions for operations for a particular database model (e.g., relational, column, document-orient, key-value, and graph model). The definitions may include the function with one or more parameters corresponding to the operation. The request generated by the service 210 may include the specified function with one or more parameters. Upon generation, the service 210 may transmit the request to the distributed database service 220 via the network 230. In some embodiments, the client 205 interfaces with or otherwise communicates directly with the distributed database service 220 to carry out the operations. The client 205 may generate a request to send to the distributed database 220 in furtherance of the operation. The generation of the request by the client 205 may be in accordance with the API. The request generated by the client 205 may include the specified function with one or more parameters. One of the parameters may specify a particular service 210 to carry out the operation at least in part. Upon generation, the client 205 may transmit the request to the distributed database service 220 via the network 230.

The service interface 235 executing on the distributed database service 220 may interface with the services 210 in carrying out the one or more operations on the data maintained on one or more of the databases 215. The distributed database service 220 may be a Database as a Service (DBaaS) platform, such as Azure Cosmos DB™, Amazon DynamoDB™, IBM Information Management System™, Google Cloud Datastore™, and Oracle Database Cloud Service™, among others. The service interface 235 may reserve, allocate, or otherwise set aside an amount of computational resources on the distributed database service 220 to carrying out the operations for each service 210 on the data on the databases 215 at a given time instance. The service 210 may use the computation resources on the distributed database service 220 up to the allocated amount. The computation resources may include processing, memory, and network bandwidth, among other performance metrics, on the distributed database service 220. The consumption of computational resources may be measured in terms of request units. Each request unit may correspond to an aggregated normalized sum of the consumption of processing power, memory space, and network bandwidth on the distributed database service 220 to carry out the operation. In some embodiments, the aggregated normalized sum may be a weighted summation in accordance to a function of the processing capacity, memory space, and network bandwidth, among other performance metrics. The request units may vary depending on the type of operation. For example, a read operation may consume five request units and a query operation may consume fifty request units. The amount of computational resources allocated to the service 210 may be also measured in terms of the request units. The service interface 235 may reserve, allocate, or otherwise provide up to a maximum number of request unit corresponding to the allocated amount of computational resources at a given time instance. The time instance may be measured in terms of a time window or interval.

The service interface 235 may receive the request to carry out the operation from the server 210 via the network 230. In response to receipt of the request, the service interface 235 may parse the request to identify the operation to be executed. In some embodiments, the service interface 235 may parse or process the request in accordance with the API for the database model. By parsing in accordance with the API, the service interface 235 may identify the specified function and the one or more parameters for the function to carry out the operation. With the identification of the function and the one or more parameters, the service interface 235 may then execute the operation as specified in the request. In some embodiments, the service interface 235 may invoke a process or routine on the distributed database service 220 to carry out the operation as specified by the function and the parameters for the function. In carrying out the operation, the service interface 235 may consume computational resources of the distributed database service 220. For example, the service interface 235 may run computations to carry out the operation, resulting in consumption of processing power. The service interface 235 may temporarily store data on the distributed database service 220, using memory space. Furthermore, the service interface 235 may access the databases 215 via the network 230, leading to expenditure of network bandwidth.

In addition, the service interface 235 may generate the usage data 245 for each service 210. The usage data 245 may indicate or include the amount of computational resources consumed in carrying out operations for the service 210 over time. The usage data 245 may indicate or include the amount of computational resources in terms of the request units provided by the distributed database service 220 to the service 210. In some embodiments, the usage data 245 may include the resources units provided by the distributed database service 220 to the service 210 over a sampling time window. The sampling time window may range, for example, between 10 seconds to 60 minutes. To generate the usage data 245 for each service 210, the service interface 235 may measure, determine, or identify a number of request units consumed each time an operation is carried out for the service 210. The service interface 235 may keep track of the consumption of computational resources on the distributed database service 220, such as processing, memory, and network bandwidth. In some embodiments, the service interface 235 may identify a margin of increase in consumption of processing power on the distributed database service 220 during the execution of the operation. In some embodiments, the service interface 235 may identify a margin of increase in consumption of memory use at the distributed database service 220 while the operation is carried out. In some embodiments, the service interface 235 may identify a margin of increase in consumption of network bandwidth by the distributed database service 220 in accessing the network 230 as the operation is executed. Based on the margin of increase in consumption of processing, memory use, and network bandwidth, the service interface 235 may determine the number of request units expended in carrying out the operation for the service 210. The service interface 235 may include or insert the determined number of request units into the usage data 245 for the service 210. In some embodiments, the service interface 235 may include number of resources units into the usage data 245 for the corresponding sampling time window. In some embodiments, the service interface 235 may maintain the usage data 245 on the storage 240.

The data processor 250 executing on the resource allocator 225 may receive the usage data 245 for at least one of the services 210 from the distributed database service 220. In some embodiments, the data processor 250 may access the storage 240 of the distributed database service 220 to identify or retrieve the usage data 245 for the service 210. In some embodiments, the data processor 250 may send a request for usage data to the distributed database 220. The request may indicate the service 210 for which the usage data 245 is to be received. Subsequent to the sending of the request, the data processor 250 may receive the usage data 245 from the distributed database service 220 via the network 230. In some embodiments, the data processor 250 may receive the usage data 245 in a set time interval. The time interval may correspond or be relative to the same sampling time window as the service interface 235 in generating the usage data 245. For example, the time interval may be equal to the sampling time window, a fraction of the sampling window, or a multiple of the sampling window. In some embodiments, the data processor 250 may receive the usage data 245 in response to a request (e.g., from a network administrator of the resource allocator 225). The data processor 250 may store the received usage data 245 into the message queue 270 maintained on the storage 265. The message queue 270 may maintain the usage data 245 for one or more of the services 210. The message queue 270 may arrange or index the usage data 245 by the corresponding service 210. In some embodiments, data processor 250 may insert or add the newly received usage data 245 into the message queue 270 maintained on the storage 265.

In some embodiments, the data processor 250 may intercept, receive, or otherwise identify the request to carry out the operations from each service 210 sent to the distributed database service 220 via the network 230. The data processor 250 may store each received request from the service 210 into the message queue 270 maintained on the storage 265. Using the requests stored on the message queue 270, the data processor 250 may separately generate the usage data 245 for the service 210. In some embodiments, the data processor 250 may generate the usage data 245 at the sampling tine window. To generate the usage data 245 for each service 210, the data processor 250 may estimate, determine, or identify a number of request units consumed by the distributed database service 220 for the service 210. The data processor 250 may generate the usage data 245 using the requests stored on the message queue 270 in the same manner as the service interface 235. The data processor 250 may keep track of the consumption of computational resources on the distributed database service 220 in carrying out the operations requested by the service 210, such as processing, memory, and network bandwidth. Based on the margin of increase in consumption of processing, memory use, and network bandwidth identified by the data processor 250, the data processor 250 may determine the number of request units expended in carrying out the operation for the service 210. The data processor 250 may include or insert the determined number of request units into the usage data 245 for the service 210. In some embodiments, the data processor 250 may include the number of resources units into the usage data 245 for the corresponding sampling time window. In some embodiments, the data processor 250 may maintain the usage data 245 on the storage 265.

With the receipt of the usage data 245, the data processor 250 may identify or otherwise provide N sets of the usage data 245 for the service 210 corresponding to N time windows. Each of the N sets may indicate or include the number of request units consumed by the distributed database service 220 in carrying out the operation for the service 210 over the corresponding time window. The number of sets (N) may be of any number, ranging from 5 to 50,000 for instance. In some embodiments, the time window for the set may be set or established based on to the sampling time window for generating the usage data 245. For example, the time window for the set may be equal to the sampling window, a fraction of the sampling window, or a multiple of the sampling window, among other values. In some embodiments, the data processor 250 may identify or otherwise provide a set for the N sets of the usage data 245, each time the usage data 245 is received from the distributed database service 220. In some embodiments, the data processor 250 may identify or otherwise provide a set for the N sets of the usage data 245, each time usage data 245 is generated from the requests stored on the message queue 270 of the storage 265. In this manner, the data processor 250 may identify or provide the N sets of the usage data 245 (e.g., in real-time) as the requests to carry out operations are received by the distributed database service 220 from the services 210 via the network 230. The data processor 250 may add, append, or otherwise include the set corresponding to the new usage data 245 onto the N sets of the usage data 245.

In providing the N sets of the usage data 245 for the service 210, the data processor 250 may perform one or more functional programming techniques using the usage data 245. In some embodiments, the data processor 250 (e.g., based on Spark streaming processing) may perform a map-and-reduce on at least a portion of the usage data 245 to provide at least one of the N sets from the usage data 245. The portion of the usage data 245 may correspond to a part of the usage data 245 within a lookback window from the present or the most recent sample of the usage data 245. The lookback window may range between 15 seconds to 1 year. In this manner, the functional programming techniques may be applied to the usage data 245 in real-time, as additional usage data 245 is received from the distributed database service 220. In some embodiments, the data processor 250 may identify the portion of the usage data 245 to which the map-and-reduce is to be performed. In performing the map-and-reduce, the data processor 250 may apply a map operation on the portion of the usage data 245. The map operation may include generating a set of pairs from the portion of the usage data 245. Each pair may be a key-value, and may include the number of request units consumed by the distributed database service 220 in carrying out the operations for the service 210 with a corresponding time window. In addition, the data processor 250 may apply a reduce operation onto the portion of the usage data 245. In some embodiments, the data processor 250 may use the set of pairs generated from the map operation. From the set of pairs, the data processor 250 may identify a subset of pairs that are equivalent in value. With the identification of the subset of pairs with equivalent values, the data processor 250 may remove the redundant subset of pairs from the set for further processing of the usage data 245. In this manner, the amount of data to process may be condensed and reduced, thereby resulting in faster computations.

With the provision of the N sets of the usage data 245 for the service 210 (e.g., each of length n), the transform agent 255 executing on the resource allocator 225 may transform at a least M subsets of the N sets into k datasets (e.g., each of length $m_k$). The M subsets of the N sets may correspond to the usage data 265 within a lookback window from the present, and may include the most subsets in the N set for the previous M time windows. The number of subsets (M) may be of any number less than the total number of sets (N). In some embodiments, the transform agent 255 may select or identify the M subsets from the N sets based on the corresponding time windows of the N sets. For each set in the N sets of the usage data 245, the transform agent 255 may traverse through the N sets to identify a corresponding time window. The transform agent 255 may compare the corresponding time window to the lookback window to determine whether the time window is within the lookback window. If the corresponding time window of the set is within the lookback window, the transform agent 255 may include the set into the M subsets for further processing. Otherwise, if the corresponding time window of the set is outside the lookback window, the transform agent 255 may exclude the set from the M subsets.

Using the M subsets from the N sets of the usage data 245, the transform agent 255 may apply at least one decomposition (or transformation) operation on the M subsets to transform to or generate the k datasets. The decomposition operation may convert the M subsets from one domain to another domain. For example, the M subsets may be time-series data, and the transformed k datasets may be a frequency domain representation of the data of the M subsets. The decomposition operation may include a Wavelet transform, a Fourier transform (e.g., discrete Fourier transform for a cyclic series or a short-time Fourier transform), Holt's Linear Trend method, and/or a Hilbert transform, among others. In some embodiments, the transform agent 255 may apply the decomposition operation over the entire M subsets. In some embodiments, the transform agent 255 may apply the decomposition operation to each of the M subsets. For example, the transform agent 255 may apply the decomposition operation (e.g., Fourier transform, such as Wavelet Transform) over the time-series usage data 245 in each of the M subsets to generate a resultant k-th dataset. The data in the k-th dataset may correspond to the frequency domain of the time-series usage data 245 of the corresponding subset.

Applying the decomposition operation onto the M subsets, the transform agent 255 may generate k datasets. Each of the k datasets may correspond to a constituent component of the M subsets. The number of k datasets may vary, and, in some embodiments, may be at least three (or at least two). Each k dataset may correspond to a different frequency component of the M subsets, such as low, median, and high frequency bands. In some embodiments, one of the k datasets may correspond to a lower frequency component of the M subsets. The k-th transformed dataset corresponding to the lower frequency component may indicate a trend in the data of the M subsets. In some embodiments, one of the k datasets may correspond to a median frequency component of the M subsets. The median frequency component may be greater in frequency than the lower frequency component. The k-th transformed dataset corresponding to the median frequency component may indicate cycles of periods (or periodicity or cycles) in the data of the M subsets. In some embodiments, one of the k datasets may correspond to a higher frequency component of the M subsets. The higher frequency component may be greater in frequency than the lower frequency component and the median frequency component. The k-th transformed dataset corresponding to the median frequency component may indicate spikes or noise in the data of the M subsets.

In transforming the M subsets, the transform agent 255 may process the M subsets as a stochastic process, such as a stationary stochastic process. By processing the M subsets as a stationary stochastic process, the transform agent 255 may modify the data in at least one of the k datasets. In some embodiments, the transform agent 255 may amplify or increase the values of the data in the k-th transformed dataset corresponding to the lower frequency component in the data of the M subsets. In some embodiments, the transform agent 255 may increase a weight (e.g., a multiplicative factor) for the values in the k-th transformed dataset corresponding to the lower frequency component. In some embodiments, the transform agent 255 may decrease or suppress the values of the data in the k-th transformed dataset corresponding to the higher frequency component. In some embodiments, the transform agent 255 may decrease a weight (e.g., a multiplicative factor) for the values in the k-th transformed dataset corresponding to the higher frequency component.

According to the k dataset from transforming the M subsets of the usage data, the predictor 260 executing on the resource allocator 225 may determine or provide a predicted value of request units ($Pre_k$). For each of the k datasets, the predictor 260 may determine corresponding prediction data. The corresponding prediction data may indicate or provide a constituent contributory component from the corresponding transformed k-th dataset to the final predicted value of request units at a given time instance. The time instance may be within a look forward time of a present or the most recent sampling of the usage data 245. In determining the corresponding prediction data, the predictor 260 may apply a statistical model to the corresponding transformed dataset of the k datasets. The statistical model may have the transformed dataset corresponding to one component of the transformed usage data 245 as an input and have the corresponding prediction data (e.g., as a contributory factor from the component) as an output. The statistical model may include a time series model (e.g., an autoregressive model (AM) model, autoregressive integrated moving average (ARIMA) model, autoregressive-moving average (ARMA) model, and vector auto-regression (VAR), Kalman filtering, and Holt's Linear Trend method, among others. As there are k datasets, the predictor 260 may determine k corresponding prediction data. The resource allocator 225 (e.g., predictor 260) may combine the k corresponding prediction data (via weighted combination or any function), e.g., over/across the frequency ranges. The resource allocator 225 (e.g., transform agent 255) may apply a recompose or reverse transformation (e.g., Reverse Wavelet Transform) to the prediction data (e.g., prediction data combined over/across the frequency ranges) to generate an initial predicted value (Pre) over/across the frequency ranges. In some embodiments, the resource allocator 225 (e.g., transform agent 255) may apply a recompose or reverse transformation to the prediction data (e.g., for a particular frequency range) to generate an initial predicted value (e.g., for the particular frequency range). The resource allocator 225 may combine the initial predicted values for the frequency ranges to produce an initial predicted value over/across the frequency ranges.

In some embodiments, to account for spikes, other sudden increases, or any other anomalous factors, the predictor 260 may modify the initial predicted value by a correction factor (Inc). The initial predicted valued modified by the correction factor may sometimes be referred to as an intermediary predicted value (Fin). In some embodiments, the predictor 260 may add the correction factor to the initial predicted value for the transformed dataset. The correction factor may differ for the initial predicted value each of the components to address the effect of the spikes or other anomalous factors varying across the k datasets. The correction factor may be positive to increase the initial predicted value or may be negative to decrease the initial predictive value.

In some embodiments, the predictor 260 may adjust the correction factor by a multiplicative factor (a*Inc). The multiplicative factor may be a function of the data in one or more of the transformed dataset. In some embodiments, the predictor 260 may set the multiplicative factor using an adjustment prediction model. The adjustment prediction model may include an artificial neural network (ANN), a support vector machine (SVM), a naïve Bayesian model, a linear regression model, and a logistic regression model, among others. The adjustment prediction model may be trained using a training dataset. The training dataset may include sample numbers of request units decomposed into constituent components and the associated multiplicative factor for each sample number in the constituent component. By applying the adjustment model, the predictor 260 may determine the multiplicative factor. With the determination of the multiplicative factor, the predictor 260 may add the correction factor adjusted by the multiplicative factor to the initial predicted value (Fin=Pre+a*Inc). In some embodiments, such a correction factor is not added, and thus Fin=Pre.

In some embodiments, the predictor 260 may determine a standard deviation (e.g., a standard deviation of the resource consumption data over the M subsets, of the resource consumption data over the N sets, or of one or more of the k-th transformed dataset) (a) to buffer against potential spikes or anomalies in the number of resources consumed for carrying out the operations of the service 210. The standard deviation may measure the dispersion, distribution or deviation of the data in the corresponding dataset(s)/subset(s)/set(s). In some embodiments, the predictor 260 may modify the initial predicted value by the standard deviation (Pre+a). In some embodiments, the predictor 260 may modify the initial predicted value by a multiple of the standard deviation (Pre+bσ). The multiple for the standard deviation may range between 2 to 6. In some embodiments, the predictor 260 may modify the initial predicted value by the correction factor and/or the standard deviation to produce a final predicted value Fin, e.g., (Fin=Pre+a*Inc+2σ) or (Fin=Pre+2σ).

Using the initial predicted values for the k datasets, the predictor 260 may determine the final predicted value (sometimes referred herein as an overall predicted value) for the number of request units to be consumed for carrying out the functions of the service 210 at a given time instance. The time instance may be within a look forward time of a present or the most recent sampling of the usage data 245. In some embodiments, the predictor 260 may use predicted values for the k datasets to determine the final predicted value. The predictor 260 may determine the final predicted value based on a combination of the initial predicted values corresponding to the k datasets or frequency ranges. In some embodiments and for example, the predictor 260 may determine a weighted summation of the initial predicted values for the k datasets. The weight for the initial predicted value for the k-th dataset corresponding to the lower frequency component of the M subsets may be higher than the weight for the initial predicted value for the k-th dataset corresponding to the higher frequency component of the M subsets. Upon determination, the predictor 260 may set the weighted sum as the final predicted value. The final predicted value may indicate the number of request unit that is to be allocated to the service 210 at the given time instance.

In accordance with the final predicted value, the predictor 260 may request the distributed database service 220 to provide computational resources up to the number of requests at the given time instance for service 210. In some embodiments, the predictor 260 may generate a request to allocate the number of request units. The request may indicate or identify the service 210 for which the number of request units are to be allocated. The request may also include the new maximum number of request numbers up to which the distributed database service 220 is to provide in carrying out the operations for the service 210. In some embodiments, the request may include the instance at which the new number of request units is to be set. In some embodiments, the request may include a set of request units, each with a corresponding time instance. Upon generation, the predictor 260 may transmit the request to the distributed database service 220 over the network 230.

Upon receipt of the request from the resource allocator 225, the service interface 235 may reserve, allocate, or otherwise provide up to the number of request units in carrying out the operations of the service 210 in accordance with the request from the resource allocator 215. In some embodiments, the service interface 235 may parse the request to identify the specified number of request units and the time instance. Based on the specified number of request units, the service interface 235 may modify, change, or set the number of request units to be provided in carrying out the operations for the service 210. In some embodiments, the service interface 235 may compare the current number of request units allocated to the operations of the service 210 versus the specified number of request units of the request. If the current number of request units is greater than the specified number of request units, the service interface 235 may scale up or increase the number of request units for carrying out the operations of the service 210. On the other hand, if the current number of request units is less than the specified number of request units, the service interface 235 may scale down or decrease the number of request units for carrying out the operations of the service 210. If the current number and the specified number are equal, the service interface 235 may maintain the number of request units allocated to carrying out the operations for the service 210.

The service interface 235 may generate an instruction based on the specified number of requests units for each service 210 and database 215. The instruction may include an indication of the specified number of request units for the service 210. In some embodiments, the instruction may an indication of whether the number of request units is to be scaled up, scaled down, or maintained (e.g., at various time instances). The service interface 235 may transmit the instruction to the service 210 over the network 230. In this manner, the service interface 235 may dynamically set the number of request units and the amount of computational resources set aside for executing the operations of the services 210, thereby reducing the costs from maintaining a static threshold allocation that is not fully utilized from time to time.

Figure 3:
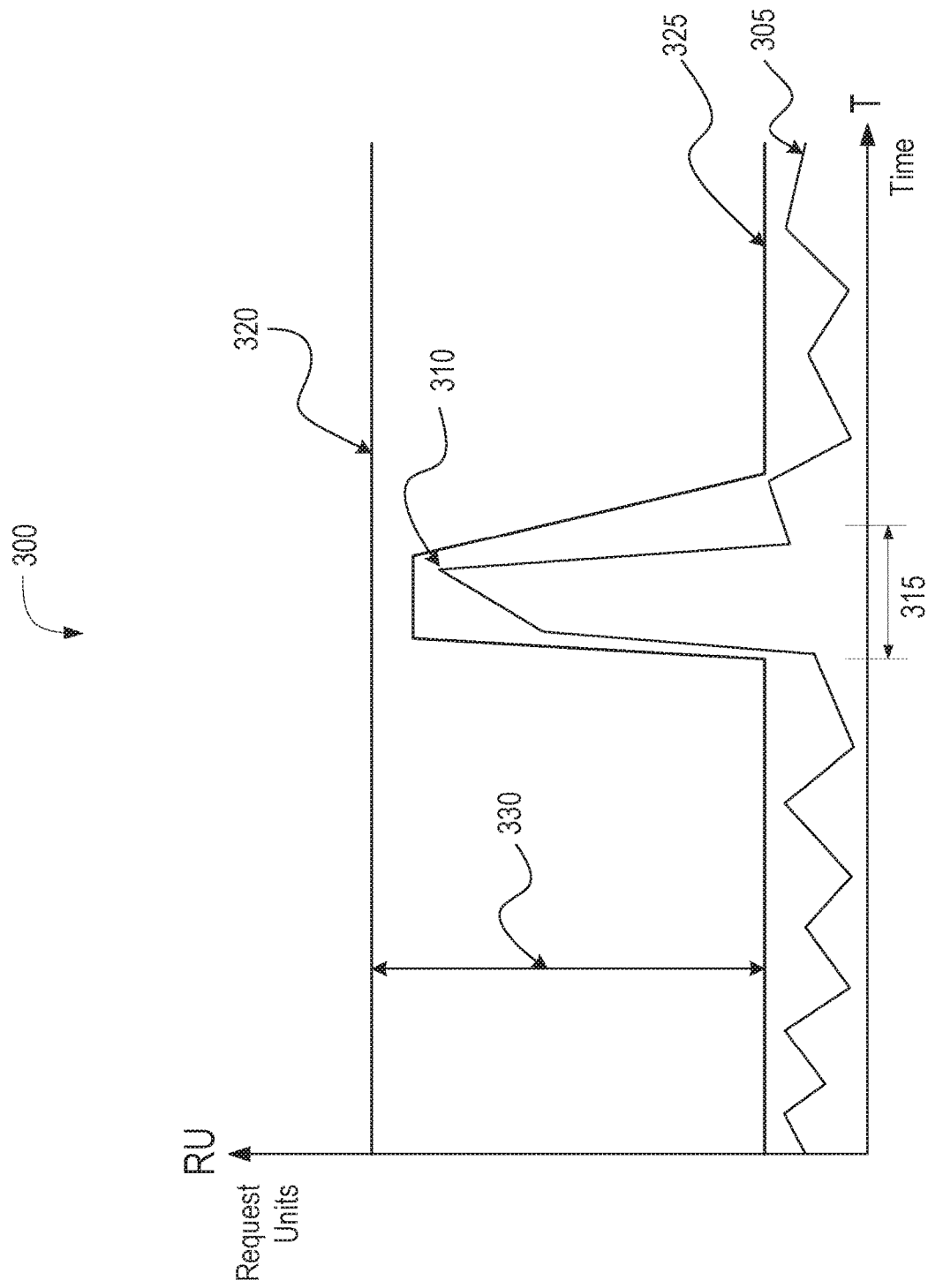
FIG. 3 is an example graph of consumption of computational resources on distributed database services.

Referring now to FIG. 3, depicted is a graph 300 of consumption of computational resources on the distributed database service 220 for a given service 210 over time. As depicted in the graph 300, a service 210 may use a varying number of request units 305 across time on the distributed database service 220. The varying number of request units 305 may indicate that the amount of computational resources expended on the distributed database service 220 may also vary across time. The varying number of request units 305 may have a peak usage point 310 confined within a timeframe 315. The timeframe 315 may be, for example, when there may be peak demand for the computational resources on the distributed database service 220 to execute operations for the service 210.

The distributed database service 220 may provide a fixed number of request units 320 to the service 210 across all time, which is not efficient and cost-effective. Alternatively, the distributed database service 220 may also predict, set and provide a dynamic number of request units 325 accordingly to the service 210. As detailed herein, the resource allocator 225 may determine a predicted number of request units to be consumed in the execution of the operations for the service 210 using the past usage data 245. The past usage data 245 may generally have a trend and/or be cyclic to some extent, and may be used to predict or indicate peak usage approximately within portions of the timeframe 315. By using the past usage data 245 to determine the predicted number of request units, the resource allocator 225 may determine the dynamic number of request units 325 on the distributed database service 220 to set aside for the operations of the service 210. In this manner, the dynamic number of request units 325 may more closely match the actual number of request units 305 used by the service 210 across time, relative to assigning the fixed number of request units 320. During non-peak times, the resource allocator 225 may save a number of request units 330 roughly equal to the difference between the fixed allocation of the number of request units 320 and the dynamic allocation of the number of request units 325.

Figure 4:
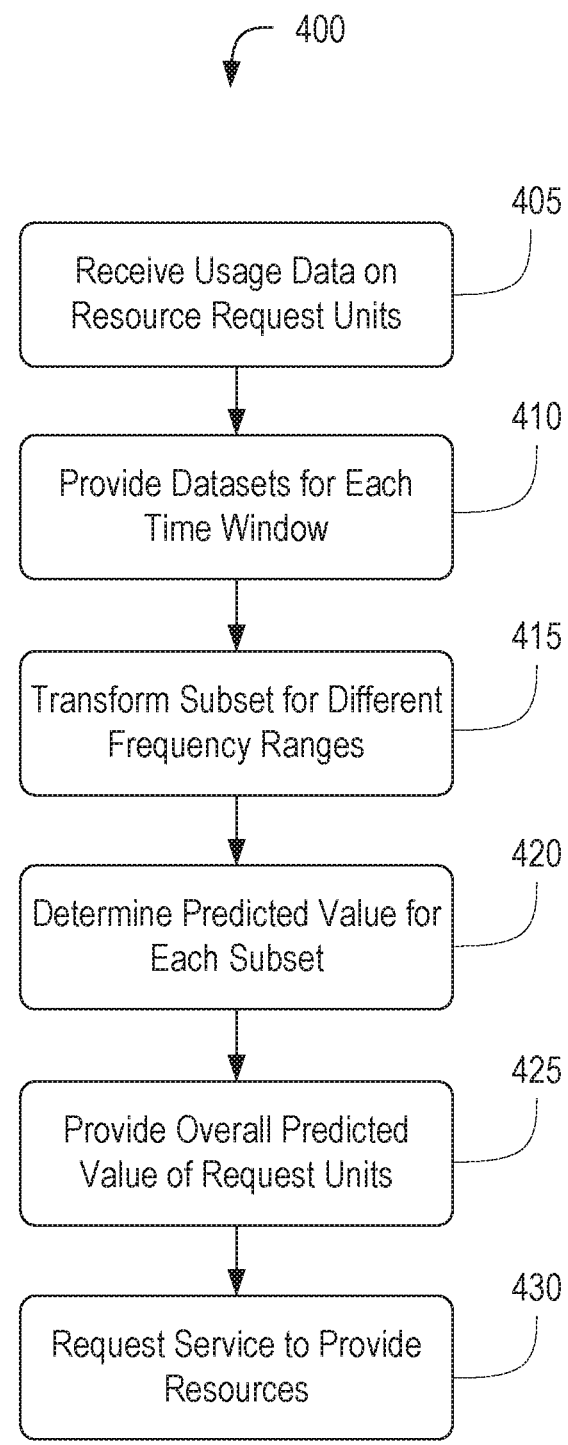
FIG. 4 is a flow diagram of an illustrative embodiment of a method of resource scaling for distributed database services.

Referring now to FIG. 4, depicted is a flow diagram of an embodiment of a method 400. The operations and functionalities of the method 400 may be performed by the components described in FIGS. 1-3, such as the system 100 and

200. In brief overview, a server may receive usage data on resource request units (405). The server may provide datasets for each time window (410). The server may transform a subset for different frequency ranges (415). The server may determine a predicted value for each subset (420). The server may provide an overall predicted value of request units (425). The server may request a service to provide resources (430).

In further detail, a server (e.g., the resource allocator 225) may receive usage data (e.g., the usage data 245) on resource request units (405). The usage data may indicate or include the amount of computational resources consumed on a distributed database service (e.g., the distributed database service 220) in carrying out operations for a particular service (e.g., the service 210) over time. The amount of computational resources consumed may be measured in terms of request unit. Each may correspond an aggregated normalized sum of the consumption of processing power, memory space, and/or network bandwidth on the distributed database service in carrying out an operation. The distributed database service or the server may record the number of request units expended on behalf of the service over time.

The server may provide datasets for each time window (410). Using the usage data, the service may divide the usage data into N sets of data over N corresponding time windows. Each of the N sets may include the number of request units consumed by the distributed database service in carrying out the operations of the service over the corresponding time window. The time window may be set based on a sampling time frame of the usage data. The server may perform functional programming techniques (e.g., map-and-reduce operation) on the usage data to provide the N sets.

The server may transform a subset for different frequency ranges (415). The server may identify or select M sets (e.g., forming a subset) from the N sets of usage data (M<N). The M sets may correspond to the usage data within a lookback window from the current time or the previous M windows from the most recent set in the usage data. The server may apply a decomposition operation (e.g., include a Wavelet transform, a Fourier transform, or a Holt's Linear Trend Method) to transform the M sets into k datasets. Each of the k datasets may correspond to a constituent component of the M subsets in the different domain (e.g., frequency domain). One of the k datasets may correspond to a low frequency component, another may correspond to a medium frequency component, and another may correspond to a high frequency component of the M sets of the usage data.

The server may determine predicted data for each subset (420). To determine the predicted data for each of the k transformed datasets, the server may apply a statistical model to the k-th dataset, such as autoregressive integrated moving average (ARIMA) model, Kalman filtering, or Holt's Linear Trend model. The predicted data for the k-th dataset may correspond to a contributory factor to the predicted number of request units to be consumed by the distributed database services in carrying out the operations at the given instance. The server may apply a reverse transformation (e.g., Reverse Wavelet Transform) to the prediction data (e.g., prediction data combined over/across the frequency ranges) to generate an initial predicted value. The server may also adjust the initial predicted value by a correction factor and/or a multiple of a standard deviation (e.g., of one or more of the datasets, of one or more of the N sets, or of one or more of the M subsets).

The server may provide an overall predicted value of request units (425). The server may determine an overall predicted value of the number of request units based on the initial predicted values for the k transformed datasets. In some embodiments, the server may apply a reverse transformation (e.g., Reverse Wavelet Transform) to the prediction data corresponding to each frequency range, to produce an initial predicted value for each corresponding frequency range. The server may combine the initial predicted values to determine the overall predicted value. For example, the server may calculate a weighted sum of the initial predicted values to determine the overall predicted value. At least one of the initial predicted values may be weighted less. At least one of the initial predicted values may be weighted more for instance. The server may adjust the combined predicted value by a correction factor and/or a multiple of a standard deviation (e.g., of one or more of the datasets, of one or more of the N sets, or of one or more of the M subsets).

The server may request a service (e.g., the distributed database services 220) to provide resources (430). The server may generate a request to provide the number (e.g., total number) of request units to service/allocate in accordance to the overall predicted value for the service for a given time (or time instance). The request may indicate the number of request units to be provided, which service is to be provided with the number of request units, and/or a time instance at which the number of request units is to be provided. Once generated, the server may send the request to the distributed database service. Upon receipt, the distributed database service may dynamically set the number of request units allocated to carrying out the operations for the service. The distributed database service may adjust (e.g., scale up, scale down, or maintain) the number of request units allocated to each service. The distributed database service may generate an instruction to each service and/or databases based on the number of request units to be provided. The instruction may include the number of request units to be provided and/or a time instance at which the number of request units is to be provided. The distributed database service may transmit the instruction to the respective services and/or the databases. In this manner, the server and the distributed database service may dynamically set and reserve the number of request units for executing the operations of the services, thereby reducing costs and wasted computing resources from maintaining a static threshold allocation.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A computing device, comprising:
   a data processor configured to:
      receive, from a distributed database service (DDS), usage data on resource request-units from a plurality of services that use resources provided by the DDS; and
      provide a plurality of datasets corresponding to a plurality of time windows, using the usage data;
   a transform agent configured to transform at least a subset of the plurality of datasets, into at least three transformed datasets each corresponding to a different frequency range; and
   a predictor configured to:
      provide a predicted value of request-units according to the at least three transformed datasets; and
      request the DDS to provide the resources up to a number of request-units at a given time instance according to the predicted value.

2. The computing device of claim 1, wherein the data processor is configured to store the received usage data into a queue in memory.

3. The computing device of claim 1, wherein the data processor is further configured to perform a map-and-reduce of at least a portion of the usage data in real time, to provide a first set of the plurality of datasets.

4. The computing device of claim 1, wherein the transform agent is configured to transform the at least a subset of the plurality of datasets using Wavelet Transform.

5. The computing device of claim 1, wherein the transform agent is configured to process the at least a subset of the plurality of datasets as a stationary stochastic process.

6. The computing device of claim 1, wherein the at least three transformed datasets correspond to a dataset indicative of a trend, a dataset indicative of cyclic data, and a dataset indicative of noise.

7. The computing device of claim 1, wherein the predictor is configured to provide the predicted value using at least one of: autoregressive-moving average model (ARMA) method, Kalman filtering, or Holt's Linear Trend method.

8. The computing device of claim 1, wherein the predictor is configured to perform a prediction on each of the at least three transformed datasets, and to provide the predicted value of request-units according to the predictions.

9. The computing device of claim 1, wherein the predictor is configured to:
   determine a standard deviation of the at least a subset of the plurality of datasets; and
   request the DDS to provide the resources up to an updated number of request-units at a given time instance according to the predicted value bounded by twice the standard deviation.

10. A method, comprising:
    receiving, from a distributed database service (DDS), usage data on resource request-units from a plurality of services that use resources provided by the DDS;
    providing a plurality of datasets corresponding to a plurality of time windows, using the usage data;
    transforming at least a subset of the plurality of datasets, into at least three transformed datasets each corresponding to a different frequency range;
    providing a predicted value of request-units according to the at least three transformed datasets; and
    requesting the DDS to provide the resources up to a number of request-units at a given time instance according to the predicted value.

11. The method of claim 10, comprising storing the received usage data into a queue in memory.

12. The method of claim 10, further comprising performing a map-and-reduce of at least a portion of the usage data in real time, to provide a first set of the plurality of datasets.

13. The method of claim 10, comprising transforming the at least the subset of the plurality of datasets using Wavelet Transform.

14. The method of claim 10, comprising processing the at least the subset of the plurality of datasets as a stationary stochastic process.

15. The method of claim 10, wherein the at least three transformed datasets correspond to a dataset indicative of a trend, a dataset indicative of cyclic data, and a dataset indicative of noise.

16. The method of claim 10, comprising providing the predicted value using autoregressive-moving average model (ARMA) method, Kalman filtering, or Holt's Linear Trend method.

17. The method of claim 10, further comprising performing a prediction on each of the at least three transformed datasets, and providing the predicted value of request-units according to the predictions.

18. The method of claim 10, further comprising:
    determining a standard deviation of the at least a subset of the plurality of datasets of processed usage data; and
    requesting the DDS to provide the resources up to an updated number of request-units at a given time instance according to the predicted value bounded by twice the standard deviation.

19. A non-transitory computer readable medium storing program instructions for causing one or more processors to:
    receive, from a distributed database service (DDS), usage data on resource request-units from a plurality of services that use resources provided by the DDS;
    provide a plurality of datasets corresponding to a plurality of time windows, using the usage data;
    transform at least a subset of the plurality of datasets, into at least three transformed datasets each corresponding to a different frequency range;
    provide a predicted value of request-units according to the at least three transformed datasets; and
    request the DDS to provide the resources up to a number of request-units at a given time instance according to the predicted value.

20. The non-transitory computer readable medium of claim 19, wherein the program instructions further cause the one or more processors to:
- transform the at least a subset of the plurality of datasets using Wavelet Transform, into at least three transformed datasets each corresponding to a different frequency range; and
- provide a predicted value of request-units according to the at least three transformed datasets, using an autoregressive-moving average model (ARMA) method.

* * * * *